United States Patent [19]
Kawai

[11] 4,211,197
[45] Jul. 8, 1980

[54] COMPRESSIVE PRESSURE AUGMENTATION DEVICE

[76] Inventor: Mitsuji Kawai, No. 26, 1-chome Kaname-cho, Toshima-ku, Tokyo, Japan

[21] Appl. No.: 925,979

[22] Filed: Jul. 19, 1978

[51] Int. Cl.² ............................................. F02N 23/04
[52] U.S. Cl. .................................... 123/585; 180/178
[58] Field of Search ............... 123/123–124 B, 123/119 D, 102, 119 DB; 180/105 E, 109

[56] References Cited

U.S. PATENT DOCUMENTS

| | | | |
|---|---|---|---|
| 1,160,472 | 11/1915 | Wallmann | 123/124 B |
| 1,324,436 | 12/1919 | Singelyn | 123/124 B |
| 1,503,555 | 8/1924 | Raule | 123/124 B |
| 1,513,142 | 10/1924 | Webb | 123/124 B |
| 1,577,766 | 3/1926 | Sisson | 123/124 B |
| 1,883,686 | 10/1932 | Geiger | 123/124 B |
| 2,155,670 | 4/1939 | Macbeth | 123/124 B |
| 2,558,843 | 7/1951 | Grant | 123/124 B |

FOREIGN PATENT DOCUMENTS 554374  7/1943  United Kingdom ................ 123/124 B

*Primary Examiner*—Wendell E. Burns
*Attorney, Agent, or Firm*—Irving M. Weiner; Pamela S. Burt; Melvin Yedlin

[57] ABSTRACT

A compressive pressure augmentation device, operable when the combustion chamber in a vehicle engine is directly air-cooled and the vehicle is running at a constant speed, in which an air supply pipe and air cleaners are connected together by means of an air suction pipe. A valve is provided in the air suction pipe. Electromagnetic coils are provided to selectively fully open and partially open the valve.

7 Claims, 6 Drawing Figures

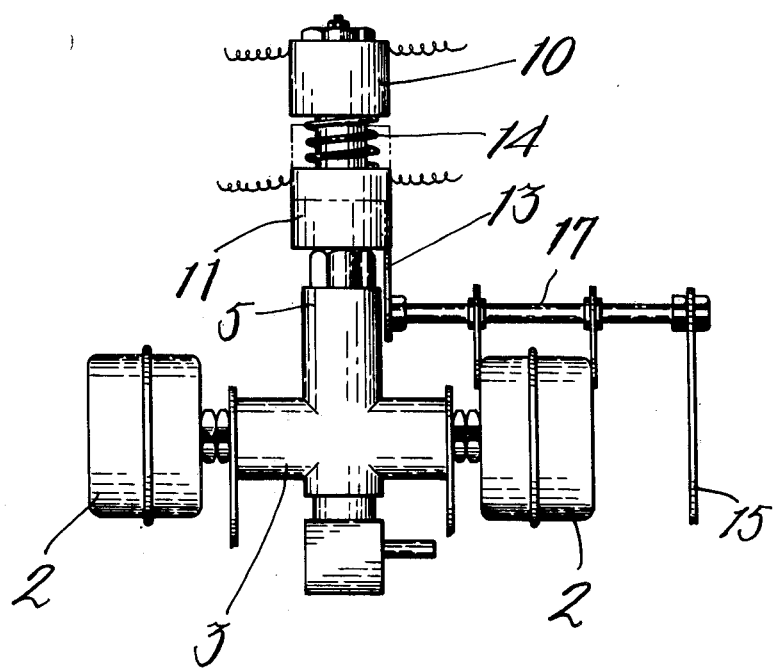

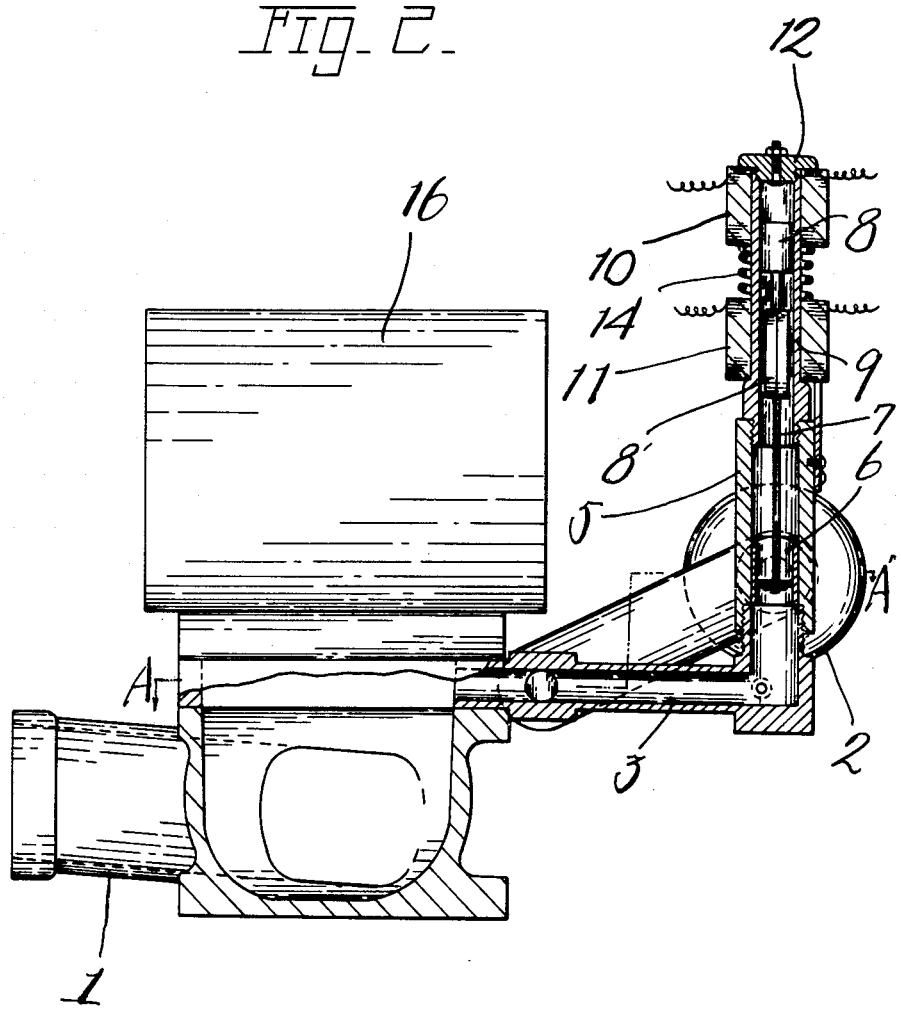

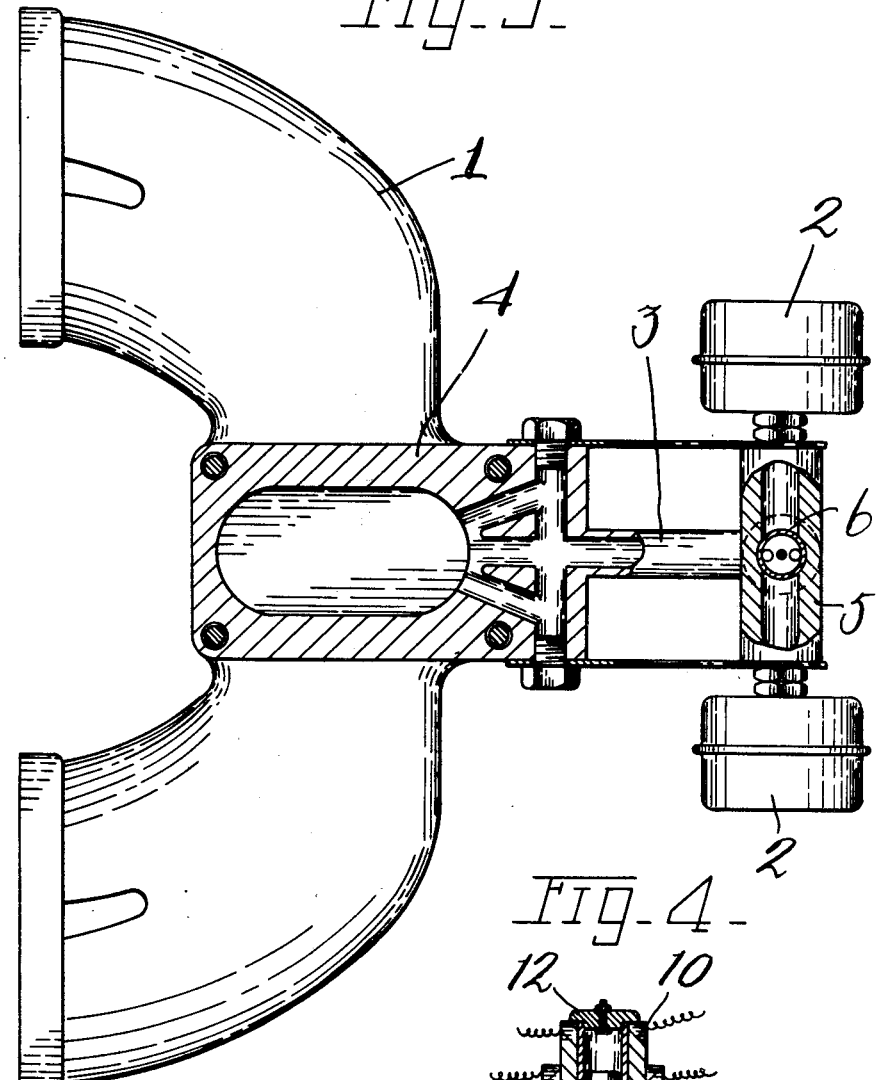
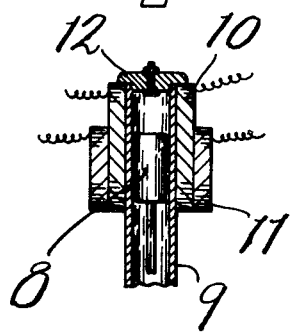

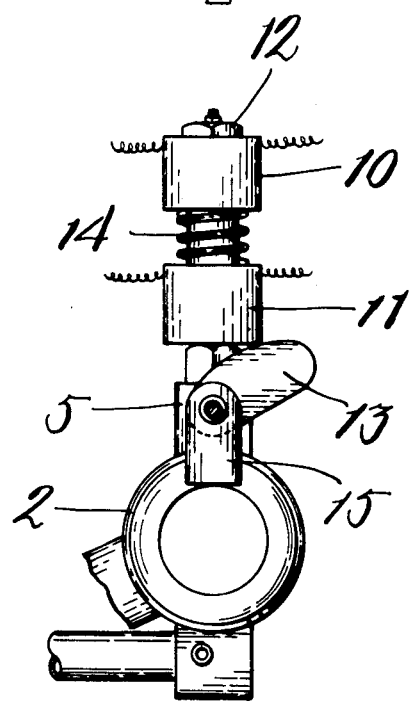

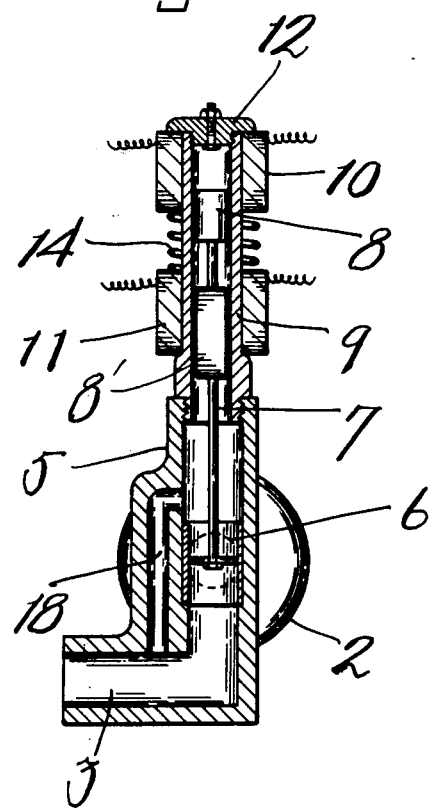

COMPRESSIVE PRESSURE AUGMENTATION DEVICE

The present invention relates generally to a compressive pressure augmentation device. In particular, the invention relates to a device for augmenting pressure within a cylinder of a combustion chamber in a vehicle engine when the combustion chamber is directly air-cooled and the vehicle is running at a constant speed.

BRIEF SUMMARY OF THE INVENTION

According to the present invention, when the running speed of a vehicle should be reduced by reducing the force applied to the accelerator pedal while the vehicle is running, or the traction force of the vehicle is not necessary at a reduced speed of the vehicle, only air in a great amount is sucked into the combustion chamber. The negative pressure within the air supply pipe is reduced, and the fuel suction force is interrupted. Only air is allowed to pass through the combustion chamber to thereby eliminate uneconomical fuel consumption and, at the same time, to directly air-cool the piston head and the exhaust valve.

When the vehicle is running at a constant speed, a fuel mixture consisting of a predominating amount of air and a minor amount of fuel is sucked into the combustion chamber to augment the compressive pressure in the cylinder to thereby prevent "failure of ignition" and environmental pollution, and to reduce the amount of fuel consumption without decreasing the explosive force, even when such air-rich fuel mixture is employed.

In order to attain the above-mentioned functions, in the compressive pressure augmentation device of the present invention, the air supply pipe and air cleaner are connected together by means of an air suction pipe, and a valve is provided in the air suction pipe. Furthermore, there is provided a first electromagnetic coil to open the valve fully, and a second electromagnetic coil to open the valve partially.

The present invention provides a compressive pressure augmentation device for an engine of a vehicle. The device includes air supply means for supplying air to the engine, and air cleaning means for cleaning the air supply to the engine. The device also includes suction means disposed between the air supply means and the air cleaning means, and operably connecting the air cleaning means to the air supply means. The device also includes valve means for controlling the amount of the air supplied to the engine in accordance with the speed of the vehicle. The valve means is operably connected with the suction means. The device also includes electromagnetic means operably connected to the valve means for controlling the operation of the valve means.

According to a preferred embodiment of the present invention, there is provided a compressive pressure augmentation device, operable when the combustion chamber is directly air-cooled and the vehicle is running at a constant speed, which comprises an air supply pipe, and an air cleaner connected to the air supply pipe by means of a suction pipe. An adjusting valve is connected to the air supply pipe. A cylindrical valve is disposed within the adjusting valve and has a valve rod. Iron cores are mounted about the valve rod at vertically spaced positions along the valve rod. A cylindrical guide member is connected to the adjusting valve surrounding the iron cores in a peripherally spaced relationship thereto. Electromagnetic coils are mounted about the cylindrical guide member at different heights along the guide member and an iron piece secured to the free end of the valve rod. One of the electromagnetic coils is adapted to open the adjusting valve fully, and the other one of the electromagnetic coils is adapted to open the adjusting valve partially.

The above and other objects and attendant advantages of the present invention will be more readily apparent to those skilled in the art from a reading of the following detailed description in conjunction with the accompanying drawings which show some preferred embodiments of the invention for illustration purpose only, but not for limiting the scope of the invention in any way.

BRIEF DESCRIPTION OF THE SEVERAL VIEWS OF THE DRAWINGS

FIG. 1 illustrates a front elevational view of a compressive pressure augmentation device in accordance with the present invention.

FIG. 2 depicts a side elevational view, in partial section, of the device illustrated in FIG. 1.

FIG. 3 illustrates a cross-sectional view on an enlarged scale taken along the line A—A' of FIG. 2.

FIG. 4 depicts a fragmentary cross-sectional view of a modified arrangement of the electromagnetic coils of the present invention.

FIG. 5 illustrates a fragmentary view of the cam and adjacent components as shown in FIG. 1.

FIG. 6 shows a fragmentary elevational view in section of a modified adjusting valve of the compressive pressure augmentation device.

DETAILED DESCRIPTION

The present invention will now be described referring to the accompanying drawings which show some preferred embodiments of compressive pressure augmentation device of the present invention.

As shown in the drawings, the device includes air supply means, such as an air supply pipe 1, and air cleaning means, such as air cleaners 2, connected to the air supply pipe 1 through suction means, such as a suction pipe 3. The suction pipe 3 has a connection member 4 integrally formed therewith, and the connection member 4 is adapted to be connected to the body of a vehicle (not shown).

Valve means, such as an adjusting valve 5, is incorporated in the suction pipe 3 and has a cylindrical valve 6 therein. A rod 7 of the cylindrical valve 6 has two vertically spaced iron cores 8, 8' mounted about an upper portion of the rod 7. A cylindrical guide member 9 is connected at its lower end to the upper end of the cylindrical adjusting valve 5 and surrounds the iron cores 8 and 8' in a peripherally spaced relationship thereto.

Electromagnetic means, such as two vertically spaced electromagnetic coils 10 and 11, are mounted about the cylindrical guide member 9 to attract the iron cores 8 and 8', respectively. The upper electromagnetic coil 10 faces the upper iron core 8, and the lower electromagnetic coil 11 faces the lower iron core 8'.

An iron piece 12 is fixedly secured to the upper end of the cylindrical guide member 9 so that the position of the lower electromagnetic coil 11 can be adjusted by means of an adjusting cam 13. Cam 13 is in turn pivoted to a horizontal shaft 17 which is connected at an intermediate point between the opposite ends of the shaft to an air cleaner 2. An operation lever 15 is pivoted at one end to the other end of the horizontal shaft 17.

A coil spring 14 is disposed between the upper and lower electromagnetic coils 10 and 11. Coil 10 is held in a fixed position on guide member 9 by iron piece 12 and spring 14. Coil 11 is slidably mounted on guide member 9 between spring 14 and cam 13. A carburetor 16 (FIG. 2) is provided in communication with the air supply pipe 1 and a fuel supply pipe (not shown).

In operation, when electric current is allowed to flow through the upper electromagnetic coil 10, the iron core 8 is strongly attracted by the iron piece 12 which is then conductive. Accordingly, the valve rod 7 of the valve 6 on which the iron core 8 is mounted is pulled upwardly to fully open the cylindrical valve 6.

When electric current is allowed to pass through the lower coil 11, the iron core 8' is downwardly attracted to an intermediate position between the opposite ends of the coil 11 to thereby maintain the cylindrical valve 6 in the position corresponding to one-half, or less than one-half, of the full opening of the valve 6, as determined by the position of cam 13.

The arrangement of the electromagnetic coils 10 and 11 can be varied as shown in FIG. 4 in which the electromagnetic coil 11 is disposed about or surrounding the electromagnetic coil 10.

With reference to FIGS. 1 and 5, the operation lever 15 is connected at one end to an accelerator pedal (not shown), so that when the operation lever 15 is pivoted by an amount depending upon a particular vehicle speed, the cam 13, which is also pivoted to the shaft 17 to which the operation lever 15 is pivoted, pivots a corresponding amount.

FIG. 6 shows a modified form of adjusting valve 5 of the invention. In this modified adjusting valve, in order to maintain the opposite sides of the cylindrical valve 6 which face the suction pipe 3 and the adjusting valve 5, respectively at the same magnitude of negative pressure, the adjusting valve 5 is increased in thickness on one side thereof. The increased thickness side of the adjusting valve is provided with a communication bore 18 which extends vertically through the valve wall and opens at its opposite ends into the suction pipe 3 and adjusting valve 5, respectively. Thus, the opening and closing operation of the cylindrical valve 6 is always maintained under stabilized conditions even when the negative pressure within the suction pipe 3 varies.

With the above arrangement and construction of the component parts of the compressive pressure augmentation device, according to the present invention, because the cylindrical valve 6 is moved in two different modes, the valve can be maintained in its fully open position or partially open position depending upon a particular vehicle speed. As mentioned hereinabove, when the vehicle is running at a reduced speed, the valve is in its full open position to allow a great amount of air to flow into the combustion chamber while the supply of fuel to the combustion chamber is interrupted to thereby decrease fuel consumption. Furthermore, when the vehicle is running at a normal speed, a fuel mixture having a predominant amount of air and a minor amount of fuel is drawn into the cylinder (not shown) to thereby augment compressive pressure in the cylinder. Thus, the present invention attains economical consumption of fuel and minimizes environmental pollution.

I claim:

1. A compressive pressure augmentation device for an engine of a vehicle, comprising:

air supply means for supplying air to said engine;
air cleaning means for cleaning said air supplied to said engine;
suction means disposed between said air supply means and said air cleaning means, and operably connecting said air cleaning means to said air supply means;
valve means for controlling the amount of said air supplied to said engine in accordance with the speed of said vehicle, said valve means comprising an adjusting valve which includes a cylindrical valve and a valve rod;
said valve means being operably connected with said suction means;
iron cores mounted about said valve rod at vertically-spaced positions along said valve rod;
a cylindrical guide member connected to said adjusting valve surrounding said iron cores in a peripherally spaced relationship thereto;
electromagnetic means operably connected to said valve means for controlling the operation of said valve means, said electromagnetic means being adapted to selectively open said adjusting valve fully or partially;
said electromagnetic means including electromagnetic coils mounted about said cylindrical guide member at different heights along said cylindrical guide member;
one of said electromagnetic coils being adapted to open said adjusting valve fully; and
the other of said electromagnetic coils being slidably mounted about said cylindrical guide member and being adapted to open said adjusting valve partially.

2. A device according to claim 1, wherein:
said compressive pressure augmentation device augments the pressure within a cylinder in a combustion chamber of said vehicle when said combustion chamber is directly air-cooled and said vehicle is running at a constant speed.

3. A device according to claim 1, wherein:
said adjusting valve is connected to said air supply means.

4. A device according to claim 1, including:
an iron piece secured to the free end of said valve rod.

5. A device according to claim 1, wherein:
two said iron cores are mounted about said valve rod at vertically-spaced positions along said valve rod;
two said electromagnetic coils are mounted about said cylindrical guide member at different heights in respective upper and lower positions along said cylindrical guide member;
said one of said electromagnetic coils which is adapted to open said adjusting valve fully is mounted in said upper position along said cylindrical guide member; and
said other of said electromagnetic coils which is slidably mounted about said cylindrical guide member and is adapted to open said adjusting valve partially is mounted in said lower position along said cylindrical guide member and is movable in up and down directions along said cylindrical guide member.

6. A compressive pressure augmentation device for an engine of a vehicle, comprising:
an air supply pipe for supplying air to said engine;
air cleaners for cleaning said air supplied to said engine;

a suction pipe;

said compressive pressure augmentation device being operable when a combustion chamber of said engine of said vehicle is directly air-cooled and said vehicle is running at a constant speed;

said air supply pipe and said air cleaners being connected to said air supply pipe by means of said suction pipe;

valve means for controlling the amount of said air supplied to said engine in accordance with the speed of said vehicle;

said valve means including an adjusting valve connected to said air supply pipe;

said valve means being operably connected with said suction pipe;

electromagnetic means operably connected to said valve means for controlling the operation of said valve means;

said valve means including a cylindrical valve disposed within said adjusting valve and having a valve rod;

iron cores mounted about said valve rod at vertically spaced positions along said valve rod;

a cylindrical guide member connected to said adjusting valve surrounding said iron cores in a peripherally spaced relationship thereto;

said electromagnetic means including electromagnetic coils mounted about said cylindrical guide member at different heights along said cylindrical guide member;

an iron piece secured to the free end of said valve rod;

one of said electromagnetic coils being adapted to open said adjusting valve fully; and the other of said electromagnetic coils being adapted to open said adjusting valve partially.

7. A device according to claim 6, wherein:

two said iron cores are mounted about said valve rod at vertically-spaced positions along said valve rod;

two said electromagnetic coils are mounted about said cylindrical guide member at different heights in respective upper and lower positions along said cylindrical guide member;

said one of said electromagnetic coils which is adapted to open said adjusting valve fully is mounted in said upper position along said cylindrical guide member; and said other of said electromagnetic coils which is slidably mounted about said cylindrical guide member and is adapted to open said adjusting valve partially is mounted in said lower position along said cylindrical guide member and is movable in up and down directions along said cylindrical guide member.

* * * * *

UNITED STATES PATENT AND TRADEMARK OFFICE
CERTIFICATE OF CORRECTION

PATENT NO. : 4,211,197
DATED : July 8, 1980
INVENTOR(S) : Mitsuji Kawai

It is certified that error appears in the above-identified patent and that said Letters Patent are hereby corrected as shown below:

On the title page, after "[22] Filed: Jul. 19, 1978" insert:

--[30]  Foreign Application Priority Data
   August 5, 1977 [JP]  Japan ............52-93889 --.

Signed and Sealed this

Sixteenth Day of February 1982

[SEAL]

Attest:

GERALD J. MOSSINGHOFF

Attesting Officer    Commissioner of Patents and Trademarks